United States Patent
Koljonen et al.

[11] Patent Number: 5,835,622
[45] Date of Patent: Nov. 10, 1998

[54] METHOD AND APPARATUS TO LOCATE AND MEASURE CAPILLARY INDENTATION MARKS ON WIRE BONDED LEADS

[75] Inventors: Juha Koljonen, Needham; John P. Petry, III, West Newton, both of Mass.

[73] Assignee: Cognex Corporation, Natick, Mass.

[21] Appl. No.: 520,935

[22] Filed: Aug. 31, 1995

Related U.S. Application Data

[63] Continuation-in-part of Ser. No. 236,213, May 2, 1994, Pat. No. 5,581,632.

[51] Int. Cl.⁶ .................................................... G06K 9/20
[52] U.S. Cl. .......................... 382/146; 382/150; 382/174; 382/291
[58] Field of Search ..................................... 382/150, 141, 382/168, 151, 174, 146, 291, 170, 209, 217, 218; 348/126, 94, 95, 87

[56] References Cited

U.S. PATENT DOCUMENTS

| | | | |
|---|---|---|---|
| 4,567,610 | 1/1986 | McConnell | 382/209 |
| 4,731,863 | 3/1988 | Sezan et al. | 382/172 |
| 4,922,543 | 5/1990 | Ahlbom et al. | 382/291 |
| 4,955,060 | 9/1990 | Katsuki et al. | 382/212 |
| 4,974,077 | 11/1990 | Kusaba | 382/174 |
| 5,204,911 | 4/1993 | Schwartz et al. | 382/168 |
| 5,456,403 | 10/1995 | Nishimaki et al. | 228/102 |
| 5,581,632 | 12/1996 | Koljonen et al. | 382/150 |
| 5,640,199 | 6/1997 | Garakani | 348/87 |
| 5,642,158 | 6/1997 | Petry, III et al. | 348/87 |

OTHER PUBLICATIONS

Cheng et al., "VLSI Architecture for Size–Orientation Invariant Pattern Recognition," Proc. Advanced Comp. Techn., Reliable Systems and Applications, May 1991, pp. 63–67.

Taza et al. "Discrimination of Planar Shapes Using Shape Matrices." IEEE Trans. Systems, Man and Cybernetics, vol. 19, No. 5, Oct. 1989, pp. 1281–1289.

*Primary Examiner*—Jon Chang
*Attorney, Agent, or Firm*—Maureen Stretch

[57] ABSTRACT

A method and apparatus for locating and measuring capillary indentation marks on wire bonded leads by creating a normalized, one-dimensional circumferential projection of a candidate center location in an image of a capillary indentation mark and detecting signals in the one-dimensional circumferential projection that correspond to a predefined pattern. The one-dimensional circumferential projection can be generated and evaluated for a full or a sub-sampled set of candidate center locations according to a number of different methods.

28 Claims, 16 Drawing Sheets

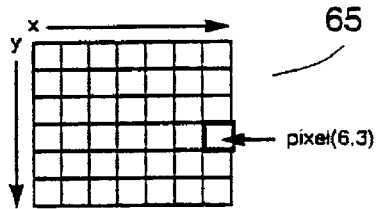
FIG 7A
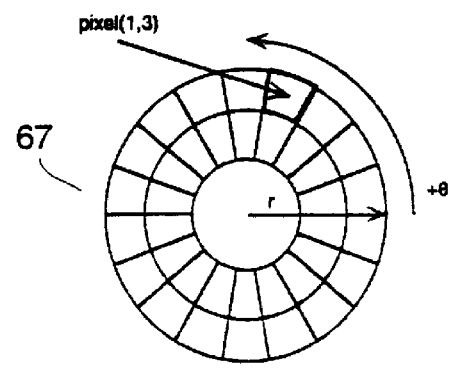
FIG 7B
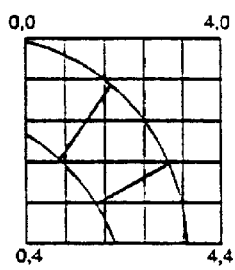
FIG 7C
$$P = \frac{\frac{1}{8}(1,1) + \frac{3}{8}(2,1) + \frac{5}{8}(1,2) + 1(2,2) + \frac{3}{8}(3,2) + \frac{1}{2}(1,3) + \frac{5}{8}(2,3) + \frac{1}{8}(3,3)}{\frac{1}{8} + \frac{3}{8} + \frac{5}{8} + 1 + \frac{3}{8} + \frac{1}{2} + \frac{5}{8} + \frac{1}{8}}$$
FIG 7D
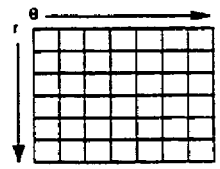
FIG 7E

```
for (r = 0; r < RMAX; r += r inc)
{
        sample_count = 0;
        theta_inc = calc_sample (r);
        for (theta = 0, theta < 360; theta += theta_inc, sample_count++)
                bin [x] = bin [r] + I (r, theta);
        bin [r] = bin [r] / sample_count;
}
```

FIG 10

METHOD AND APPARATUS TO LOCATE AND MEASURE CAPILLARY INDENTATION MARKS ON WIRE BONDED LEADS

This is a continuation in part of Application Ser. No. 08/236,213, now U.S. Pat. No. 5,581,632, Method and Apparatus For Ball Bond Inspection System, Attorney Docket Number: C93-036, filed May 2, 1994.

BACKGROUND OF THE INVENTION

This invention relates generally to machine vision systems and semiconductor chip wire bonding devices, and similar bonding apparatus, and particularly to a method and apparatus for locating and measuring capillary indentation marks.

Semiconductor devices, such as integrated circuit chips, are electrically connected to leads on a lead frame by a process known as wire bonding. Wire bonding involves placing and connecting a wire to electrically connect a pad residing on a die (semiconductor chip) to a lead in a lead frame. Once all the pads and leads on the chip and lead frame have been wire bonded, it can be packaged, often in ceramic or plastic, to form an integrated circuit device. In a typical application, a die or chip may have hundreds of pads and leads that need to be connected.

A ball bond is the connection welding a wire onto a connecting bond pad on a semiconductor circuit. The corresponding connection on the lead side (the other end of the wire) is called the crescent which borders a capillary indentation mark. A typical capillary indentation mark appears as a bright circle against a dark background and is actually caused by the bond head's capillary deforming the lead surface. To bond a wire to a lead, a bond head using a capillary 70 (as shown in FIG. 2) is vibrated at extremely high speed. As it moves on the lead 30, an indentation is formed in the shape of a ring. An inner diameter smaller than the bond head's capillary chamfer diameter and an outer diameter larger than it appear. Indentation size depends primarily on the bond head frequency, the shape of the capillary, and the force used in bonding. The appearance of the indentation mark or indentation also varies depending on the lighting.

In order to perform an automated, in-process inspection of the leads bonded by the wire bonder, a system must first locate each lead formed on a chip before an inspection can take place. Co-pending United States patent applications assigned to the same Assignee as this invention:

Automated Optical Inspection Apparatus filed Oct. 6, 1993, serial number 08/132,532 Attorney Docket No. C93-007 (now abandoned) and the file wrapper continuation thereof, Automated Optical Inspection Apparatus Application serial No. 08/389,437, Attorney Docket No. C93-007FWC, filed Feb. 15, 1995; now U.S. Pat. No. 5,532,793 and Application Ser. No. 08/458,908 Attorney Docket No. C93-021, Boundary Tracking to Find Leads, filed Jun. 6, 1995; and Apparatus And Method For Inspecting Wire Bonds On Leads, Application Ser. No. 08/491,335 Attorney Docket Number C95-007, filed Jun. 30, 1995; and Method and Apparatus for Aligning Oriented Objects, Application Ser. No. 08/367,478, filed Jan. 3, 1995, Attorney Docket Number C93-032a describe systems for use in locating a nominal or approximate center of a capillary indentation mark and each and all of these are hereby incorporated by reference herein.

Locating the capillary indentation mark therefore, is useful in providing feedback to the bonder about how accurately the bond was placed.

The capillary indentation mark that is formed is roughly the diameter of the capillary and is often in the shape of a ring. The formation of the ring is affected by the angle of the wire connecting the die to the lead, the force used in making the bond, the frequency at which the capillary is vibrated, and other factors controlled by the bonding device.

The capillary indentation mark's reflective properties are not always consistent across the indentation. There may be a fringe area immediately beyond the inner and outer diameters where the image intensity decreases (or increases, depending on the light/dark polarity of the image ) until it attains the intensity of the lead. Other problems can be created by mispositioning of the bond head or improper bond force. While an entire ring is often seen, it is also common for only an arc shaped part of it to appear.

If the capillary indentation mark can be found and measured, its presence, placement, and size indicate the quality of the connection formed on the lead. However, the visual complexity and variability surrounding the lead makes it difficult to automate these measurements, either during an in process operation or as a post-process, offline inspection. Thus, one of the major problems with locating capillary indentation marks is that they typically appear fuzzy, their edges vary in regularity around the circle and the radii of the ring may sometimes vary from one device to another.

It is an object of the invention to minimize problems in locating and measuring capillary indentation marks by applying a measurement tool at a number of candidate locations and then analyzing the results.

It is an object of the present invention to provide a method and apparatus for locating and measuring capillary indentation marks that tolerates variations in size of the indentation marks.

Still another object of the invention is to provide a method and apparatus that permits the location and measurement of arcs or partial circle capillary indentation marks.

SUMMARY OF THE INVENTION

These and other objects of the invention are achieved by applying a measuring tool at a number of candidate locations and then analyzing the results. The apparatus creates a normalized, one-dimensional circumferential projection of several candidate center locations in an acquired image of a capillary indentation mark and then analyzing the results of the one-dimensional circumferential projections to find a best match to a predetermined pattern to locate the center of the capillary indentation mark. For circular capillary indentation marks, one-dimensional circumferential projections are created by summing the pixel intensity values of each circumference at a given candidate radius R from a candidate center location in the acquired image, and normalizing the sum for each candidate radius R in the projection. The present invention then detects signals in the one-dimensional circumferential projections that correspond to a predefined pattern. If one or more matches are the candidate center location with the one-dimensional circumference projection having the best fit is deemed the center of the capillary indentation mark, and the distance from the candidate center location with the one-dimensional circumference projection having the best fit to its edge is deemed to be the radius of the capillary indentation mark and is used to locate its center and measure its dimensions.

For circular capillary indentation marks, each bin value or array element of the one-dimensional circumferential projection is generated by summing all of the pixel values that fall under a circle of radius R from a candidate center location in a subset of the acquired image by the following formula:

$$BIN(R) = \sum_{\phi=0}^{\phi=360} I(R, \phi)$$

where $I(R, \phi)$ is the pixel intensity value at location $R,\phi$ in polar coordinates. Each bin in the one-dimensional circumferential projection is then normalized (divided) by the number of samples that contributed to it to determine the average intensity value that falls under each circumference at radius R. The one-dimensional circumferential projection is an intensity profile of the image that has been collapsed (projected) in the theta polar dimension. The edges of objects that are circular and centered at the projection center and have an image intensity that is different from the background appear as edges in this one-dimensional array. Edges are matched to a predefined pattern similar to one representative of a capillary indentation mark. The present invention applies these two main tools of creating a one-dimensional circumferential projection and then detecting signals in the result to a number of candidate center locations. If one or more matches are found, the candidate center location which has the best match to a predetermined pattern is deemed to be the center of the capillary indentation mark.

In one preferred embodiment of the present invention, a software program can be used to generate the one-dimensional circumferential projections as a function that implements the formula given above.

In another preferred embodiment of the present invention, the generation of the one-dimensional circumferential projection can be done in two parts—first, by performing a "polar unwrap" of the intensity image into a two-dimensional projection, thereby transforming it from Cartesian to polar coordinates. And then second, by projecting along the "unwrapped" image axis to generate a one-dimensional circumferential projection so that all pixel intensity values for a given R are summed. Once a one-dimensional circumferential projection has been created, the invention performs signal detection as described herein.

In still another preferred embodiment, the method and apparatus of the present invention constructs a circular distance rectangular to polar coordinate transform image having an image size that is large enough to contain the largest expected radius. This transform image is used as an index to generate a one-dimensional circumferential projection in one step, using Cognex Corporation's VC-1 image processing chip, described in U.S. Pat. No. 4,972,359, also assigned to the same Assignee as the Assignee of this invention. A variation of all the embodiments can be done using multiple segments or arcs of circles. Using transform images, an image of a bonded lead and a candidate center location of a capillary indentation mark are obtained, the transform image is aligned with a candidate center location in the acquired image, and pixel values in the image are evaluated and summed into a one-dimensional circumferential projection.

Signal detection analysis of the candidate center locations can be done in a number of different ways according to the method and apparatus of the present invention. In a first preferred embodiment, one-dimensional circumferential projections for all candidate center locations can be created and analyzed exhaustively by the signal detection means of the present invention. Alternatively, in another preferred, embodiment sub-sampling can be done, by, for example, analyzing every other candidate center location, or every nth candidate center location. In another preferred embodiment, pyramidal decomposition with Gaussian smoothing and sampling at each level can be used as a sub-sampling technique. Still again, hill-climbing could be used in another preferred embodiment to select the candidate center locations to analyze in the signal detection step.

It is an another aspect of the present invention that it allows the user to optimize computational speed requirements to keep costs associated with construction and use reasonable. For example, in one preferred embodiment, Cognex Corporation's VC-1 image processing chip is used to optimize the speed of the evaluation of transform images.

Still another aspect of the invention is that it locates radii of unknown size when radii fall within some range.

Yet another aspect of the invention is that allows the user to handle a range of contracts.

Still another aspect of the present invention is that it locates partial rings.

Another aspect of the invention is that it also handles double rings which sometimes occur.

Yet another aspect of the present invention is that it enables users to find rings with low contrast edges.

DRAWINGS

FIG. 7a is a schematic view of a Cartesian representation of an image.

FIG. 7b is a schematic view of a representation of an image in polar coordinates.

FIG. 7c is a schematic view of the translation of Cartesian source pixels to polar destination pixels using a polar unwrap.

FIG. 7d is an illustrative formula used in a preferred embodiment to perform a polar unwrap function.

FIG. 7e is a schematic view of a representation of a polar image in a buffer array.

FIG. 10 is pseudo-code in the C programming language illustrating one preferred embodiment of the present invention.

DETAILED DESCRIPTION

Figure 5:
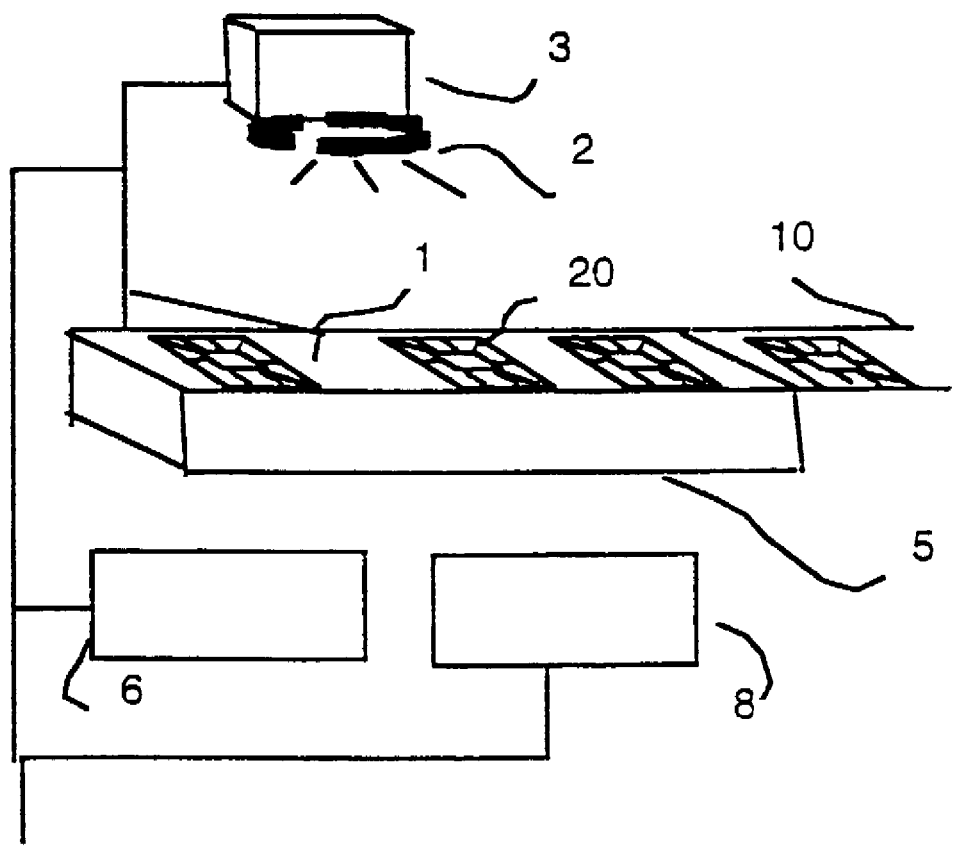
FIG. 5 is a schematic drawing of a wirebonding apparatus incorporating the present invention.

This invention locates and measures capillary indentation marks on leads that are bonded. In FIG. 5, a wirebonding system incorporating the present invention is shown. The system includes a wire bonding machine having a movable platform such as an X–Y table 5, for holding semiconductor chips 20, situated in lead frames 10; a video camera 3 or other sensing device for generating images, which camera is typically positioned over the target chip 20 and lead frame 10 to be bonded; illumination means 2 for illuminating a chip 20 in a lead frame 10; an image processor 6, capable of digitizing and analyzing the optically sensed images; bonding mechanism 1; and host controller 8 electronically connected to the bonding mechanism 1, the movable platform 5, the camera 3 and the image processor 6.

Figure 6:
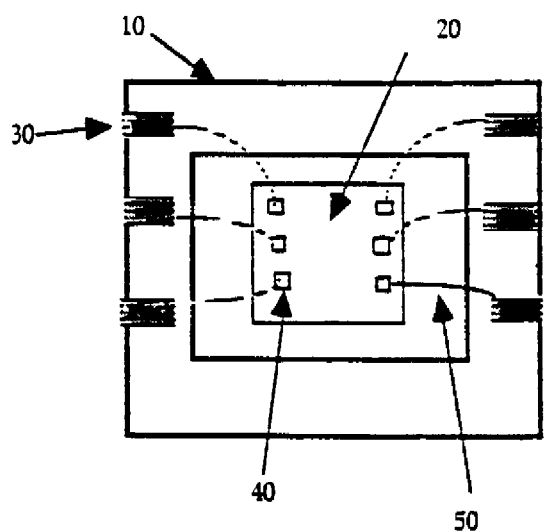
FIG. 6 is a schematic top view of a semiconductor chip on a lead frame.

FIG. 6 is an enlarged view of a semiconductor chip 20, in a lead frame 10, having pads 40, and leads 30. The wire bonding process bonds a conductive wire 50 between each pad 40 on the chip 20 and its respective lead 30 on lead frame 10.

Figure 4:
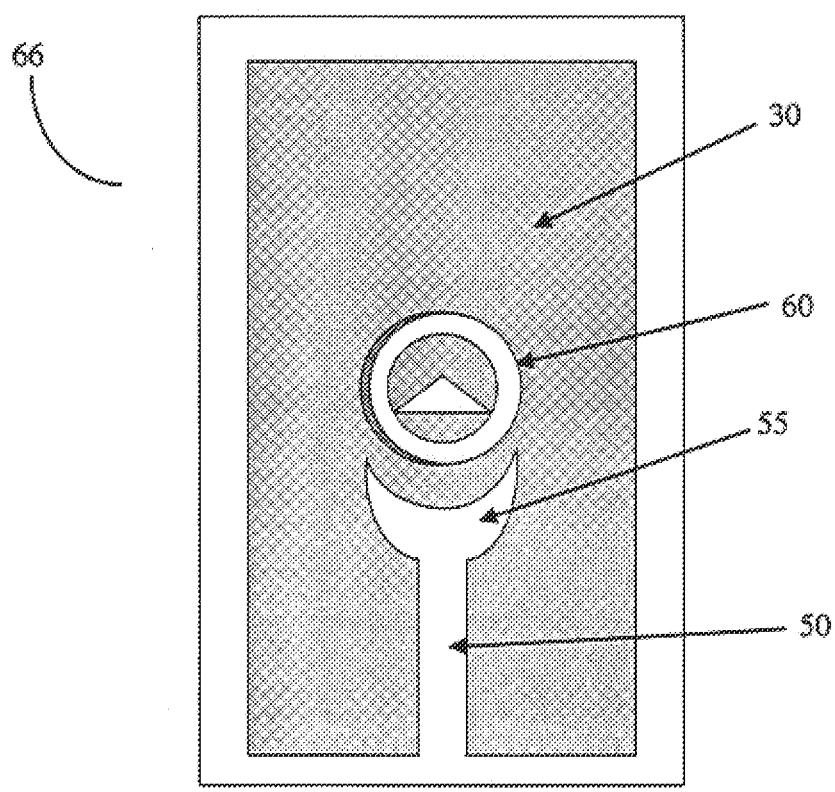
FIG. 4 is a top view of a bonded lead showing an indentation mark.

FIG. 4 shows a schematic, two dimensional top view of an image 66 of a capillary indentation mark 60 created by the bonding mechanism 1. This is typically acquired using the same optics as used on a normal wire bonder vision system. As seen in FIG. 4, the connection formed on the lead side is called the crescent 55 which borders the capillary indentation mark 60. A typical capillary indentation mark 60 appears as a bright or dark circle as shown in FIG. 4. It is actually caused by the capillary deforming the surface of lead 30.

Figure 1:
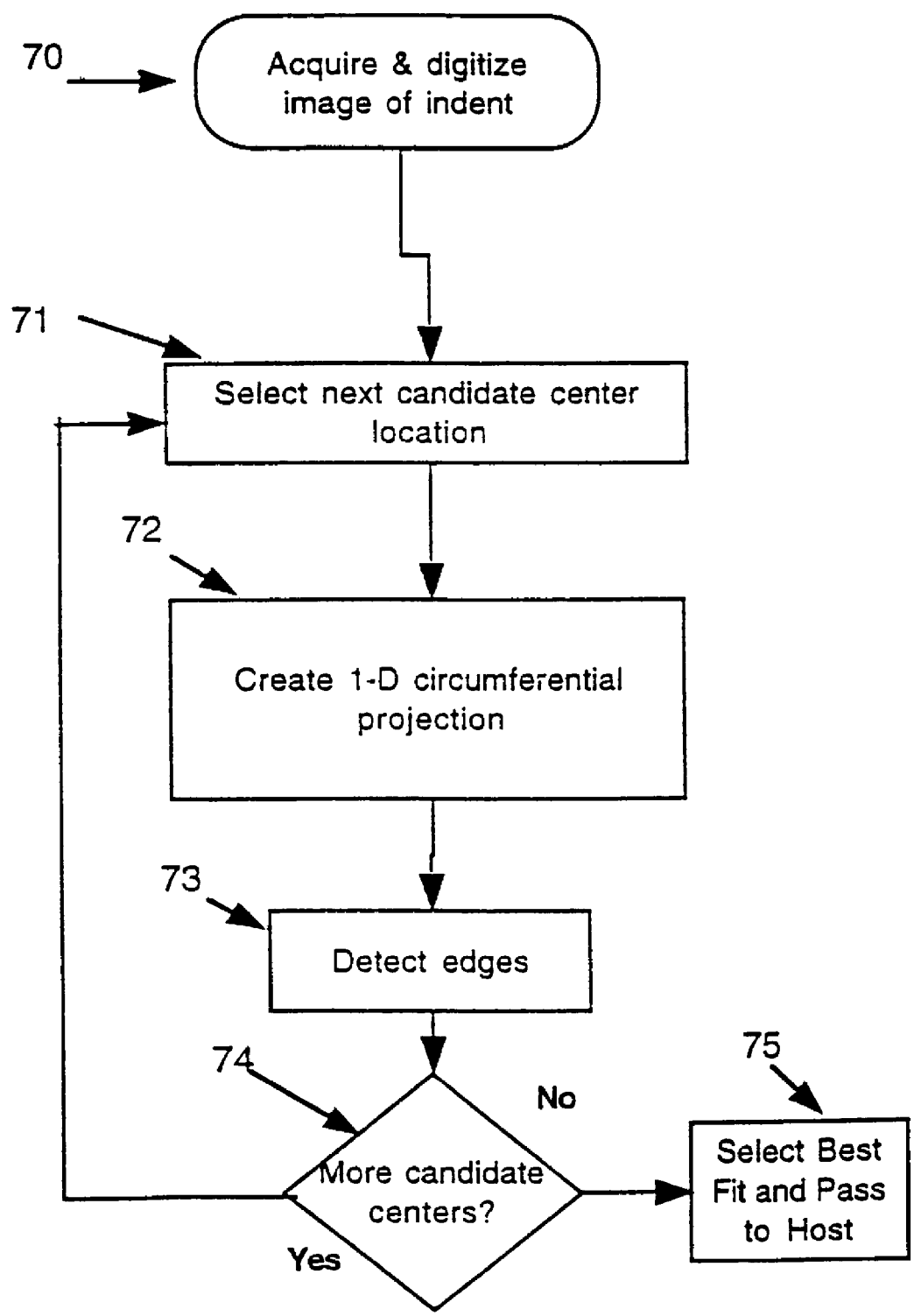
FIG. 1 is a flow diagram of the present invention showing the generation of a one-dimensional circumferential projection of a candidate center location for analysis.

Turning now to FIG. 1, image processor 6 is used to acquire and digitize an image 66 of a capillary indentation mark 60, as is shown at step 70 of FIG. 1. The above-referenced patent applications are used to find a candidate center location that could be the center of capillary indentation mark 60 within a candidate subset 65 of image 66. At step 71, a first candidate center location for a candidate subset 65 of image 66 is selected for processing. At step 72 a one-dimensional circumferential projection is created. As will be apparent to those skilled in the art, while the present invention is used to locate circular capillary indentation marks, it could also be applied to marks having rectangular, triangular or other geometric shapes, by substituting the appropriate formula for computing the circumference of that shape.

Still in FIG. 1, at step 73 signal detection is done by analyzing the one-dimensional circumferential projection to find a match to a predetermined pattern. At step 74, the invention checks to see if more candidate centers remain. If none remain, the invention proceeds to step 75 to select the best match and pass that information to the host.

Figure 1A:
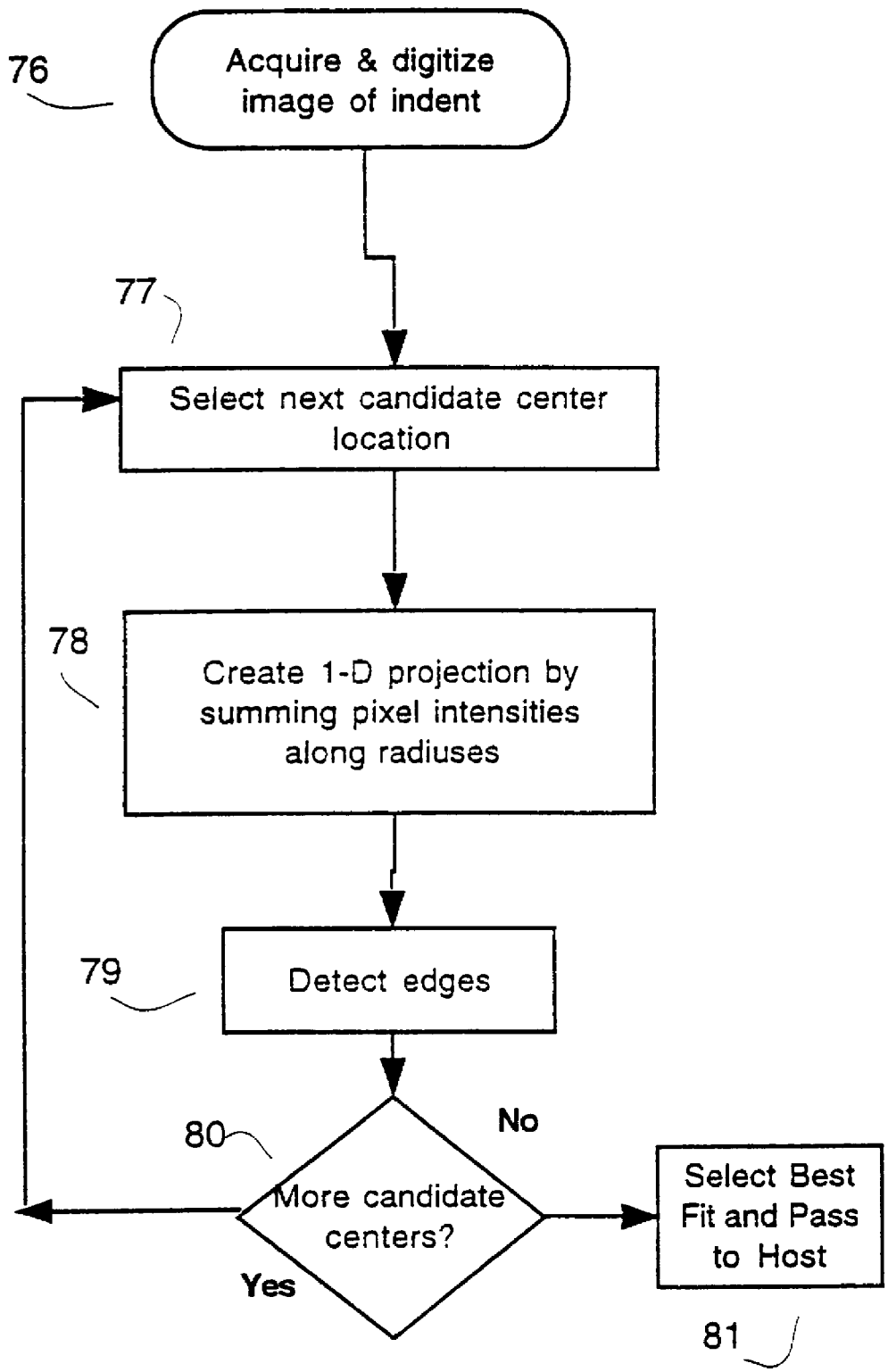
FIG. 1a is a flow diagram of a preferred embodiment of the present invention using a software function to generate a one-dimensional circumferential projection of a candidate center location for analysis.
Figure 3A:
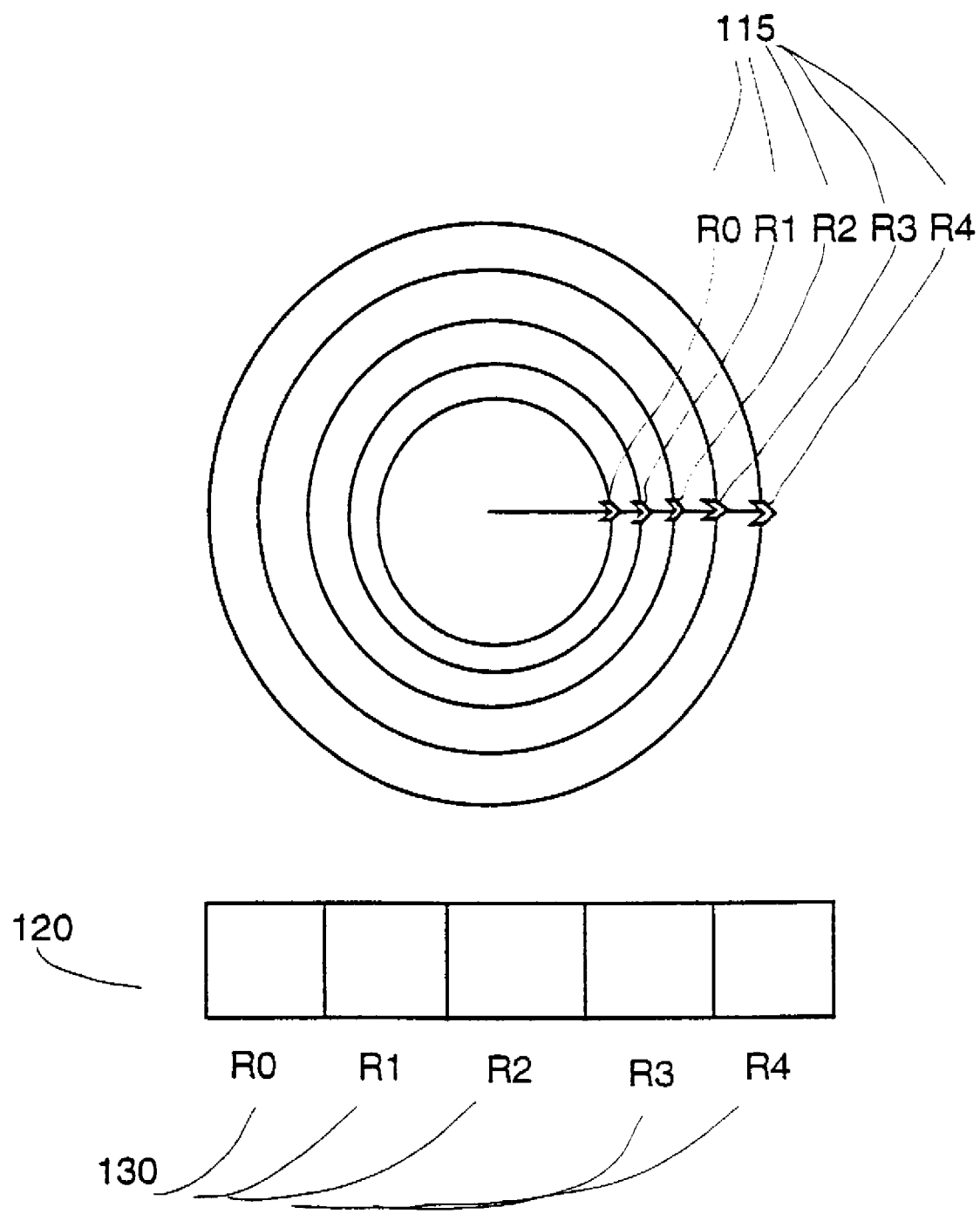
FIG. 3a is a schematic drawing of a number (n) of candidate center locations having Radiuses R.

FIG. 1a, depicts a preferred embodiment using a software function to sum pixel intensities along selected radiuses R(n) of candidate center locations to generate the one-dimensional circumferential projection for a circular indentation mark. With reference now to FIG. 3a, a number of radiuses 115, ranging from R0 through R4 are shown. Each radius 115 describes a circle that might be equal to the inner or outer ring of a capillary indentation mark 60. In this embodiment, the software function sums the pixel intensity values of each circle described by a radius 115 into a one-dimensional circumferential projection 120, having a number of bins 130 equal to the number of radiuses 115. The values for each bin (r) for each circle described by a radius 115 are calculated by the following formula:

$$BIN(R) = \sum_{\phi=0}^{\phi=360} I(R, \phi)$$

where $I(R,\phi)$ is the pixel intensity value at location $R,\phi$ in polar coordinates. Each bin 130 of one-dimensional circumferential projection 120 represents a certain radius 115. In a preferred embodiment, one-dimensional circumferential projection 120 is constructed to contain the range of values of radius 115 from 0 to a maximum (rmax). The maximum depends on the maximum size required to surround the object of interest.

Figure 11A:
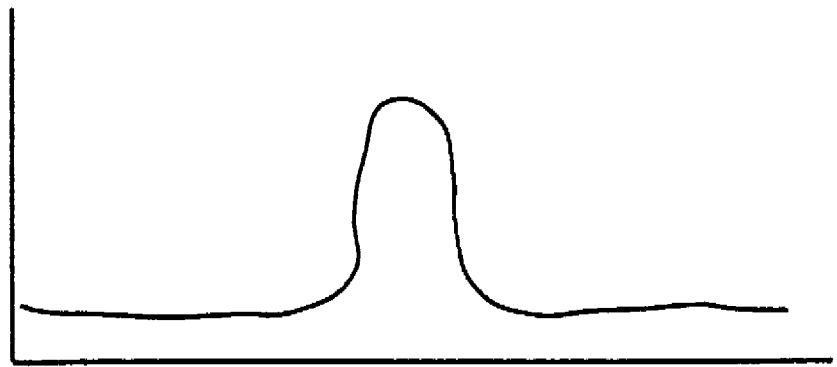
FIG. 11a is a chart of a one-dimensional projection of a solid disk.
Figure 11B:
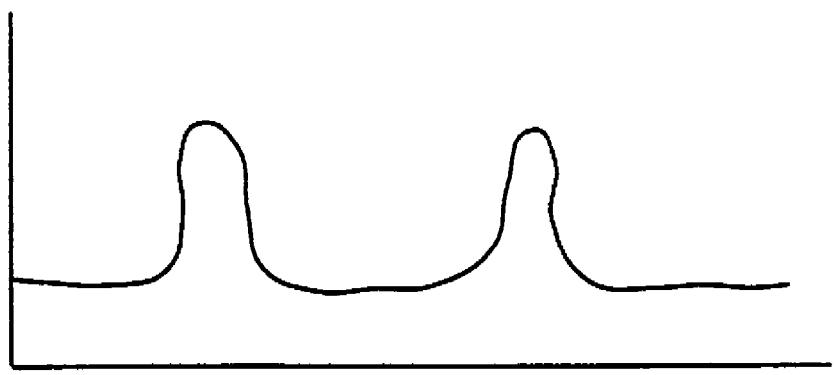
FIG. 11b is a chart of a one-dimensional projection of a ring.

Each bin 130 for each BIN(R) in the formula is normalized. That is, it is divided by the number of samples that contributed to it to determine the average intensity value for the circle described by that radius. (Each of the circles of increasing size described by a radius 115 will have more pixels that contribute to the sum, hence the need for normalizing.) The resulting one-dimensional circumferential projection 120 containing the normalized intensity values in each bin 130, represents an intensity profile of candidate subset 65 at the candidate center location that has now been collapsed or projected in the theta polar dimension. Objects that are circular and centered will appear as edges in this one-dimensional array. Rings will appear as two edges in this array. These are illustrated in the charts shown in FIG. 11a and FIG. 11b, respectively.

With reference again to FIG. 1a, once the one-dimensional circumferential projection 120 has been created and normalized, in this preferred embodiment the invention, at step 79 matches the one-dimensional circumferential projection to a predetermined pattern. One such matching process used in a preferred embodiment uses edge detection by taking the first derivative of the projection array 120 and locating local maxima and minima. The maxima represent positive (dark to light transition) edges and the minima represent negative edges (light to dark transition). A ring or circle that has a center that does not exactly correspond to the center of the polar projection will have edges in the one-dimensional circumferential projection 120 that have lower contrast than perfectly centered circles.

Once a pattern of edges is found in one-dimensional circumferential projection 120, the pattern is matched to a desired or model edge pattern to determine if the center of capillary indentation mark 60 in candidate subset 65 is located at the center of the one-dimensional circumferential projection 120. In a preferred embodiment, a score for the match between the pattern and this particular candidate center location can be assigned. The best match location will have a good edge pattern match and the highest contrast edges. A next candidate center location within image 66 is then selected and steps 78 through 80 are repeated until all the candidate center locations have been evaluated. The candidate center location with the best match will be used to calculate the center of indentation mark 60 in image 66 and its location and dimensions will be passed to the host controller 8, as shown at step 81 in FIG. 1a.

The embodiment described in FIG. 1a can be implemented in code similar to that shown in the C language pseudo-code in FIG. 10. This embodiment can be used on general purpose computers, but in a preferred embodiment it would be used on computers having a RISC (Reduced Instruction Set Computer) architecture and floating point processor(s), to provide fast processing times. Speed can also be improved using the sub-sampling techniques described below.

Figure 1B:
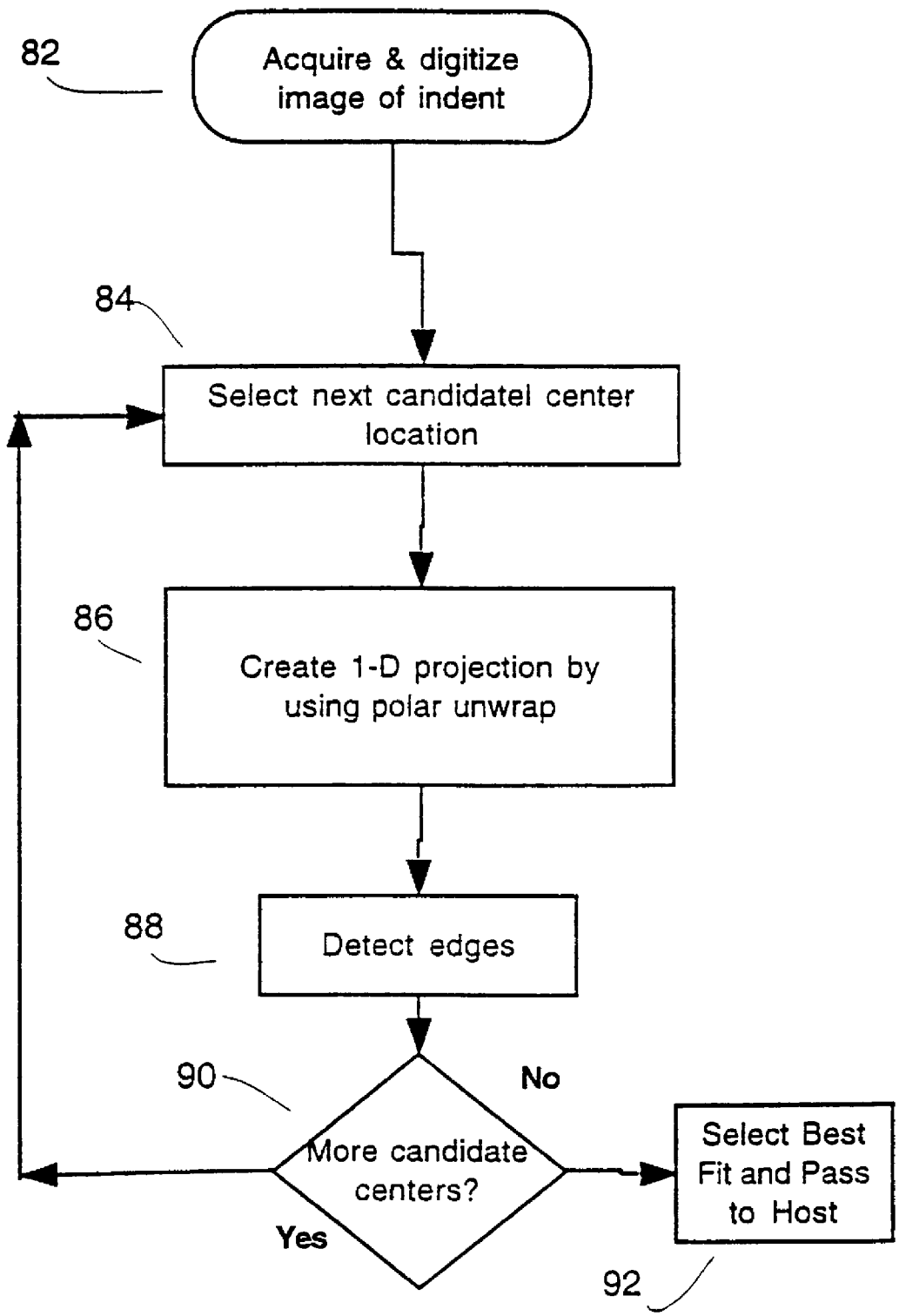
FIG. 1b is a flow diagram of another preferred embodiment of the present invention using a polar unwrap function to ultimately create a one-dimensional circumferential projection of a candidate center location for analysis.
Figure 3B:
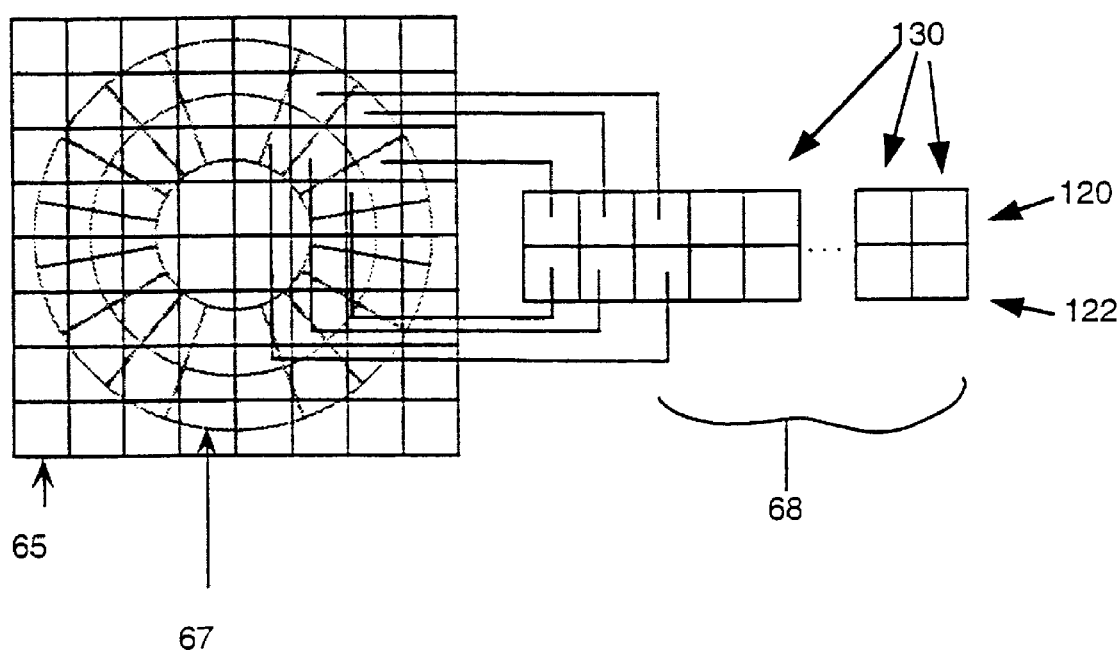
FIG. 3b is a schematic drawing of a two-dimensional projection created by using a polar unwrap.

Turning now to FIG. 1b, another preferred embodiment of the present invention is shown in flow diagram form. In this embodiment, an image 66 is acquired and digitized, as before, at step 82, and at step 84 a next candidate center location is selected. However, at step 86, a two-dimensional projection is created using a polar unwrap function. In order to create a one-dimensional circumferential projection, this present invention sums along one axis of the 2-D projection to generate a one-dimensional circumferential projection 120. FIG. 3b illustrates the polar unwrap function.

In FIG. 3b, a candidate subset 65 of image 66 is shown in Cartesian coordinates, with an outline of a polar representation 67 superimposed on candidate subset 65. In Cartesian coordinates, the pixels of candidate subset 65 are square and the coordinates of a point are represented as x and y; in polar representation 67, the pixels look like wedges or keystones and the coordinates of a point are represented as radius (r) and theta ($\phi$).

Figure 7F:
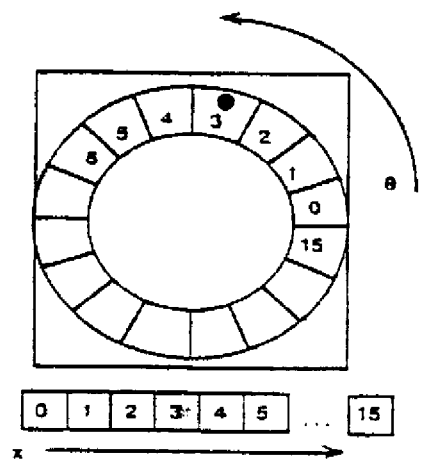
FIG. 7f is a schematic view of a polar unwrap of an image into a one-dimensional circumferential projection.

A polar unwrap function maps the pixels (with coordinates x,y) in the Cartesian source candidate subset 65 to pixels (with coordinates r,$\phi$) in the polar destination image 68. Each pixel in polar destination image 68 contains some number of whole and/or fractional pieces of the Cartesian coordinate pixels in source candidate subset 65. These source pixels are averaged together and normalized to form the corresponding output pixel for the destination image 68. Because the pixels in the two images differ in shape, mapping (or projecting) a Cartesian image to a polar image always results in some distortion. (This is true of all Cartesian to polar projections; however, the polar unwrap may often create the least distortion.) FIGS. 7a, 7b and 7c illustrate the mapping of Cartesian to polar image pixels.

Turning first to FIG. 7a, a Cartesian source candidate subset 65 is shown, having x,y coordinates 0,0 at the upper left. FIG. 7b shows a polar representation image 67, having polar coordinates r, $\phi$. In this example, the pixel at Cartesian coordinates x=6 and y=3 in candidate subset 65 of FIG. 7a is mapped into the pixel at polar coordinates r=1 and $\phi$=3 in polar representation image 67.

Figure 7G:
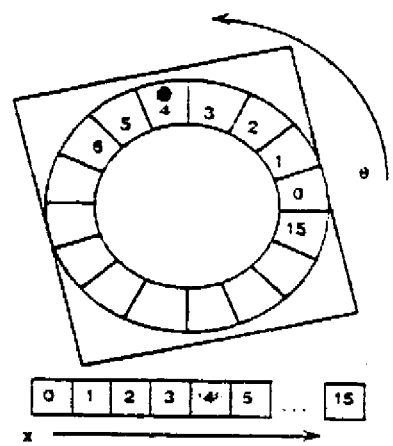
FIG. 7g is a schematic view of a polar unwrap of a rotated image into a one-dimensional circumferential projection.

FIG. 7-c shows how source pixels in Cartesian coordinates of candidate subset 65 contribute to destination pixels in polar representation 67. The equation in FIG. 7d shows the portion of each pixel that will contribute to the destination pixel.

In a preferred embodiment using a Cognex Corporation image processor, both the source image and the destination image are represented as arrays known as image buffers or cip_buffers. By convention, the radial (r) dimension of the polar image is the y dimension of the cip_buffer; the theta (O) dimension of the polar image is the x dimension of the cip_buffer as shown in FIG. 7e.

Returning now to FIG. 3b, it can be seen that as a candidate subset 65 is "unwrapped", using a 2-pixel depth function, from Cartesian coordinates to polar coordinates, a two-dimensional polar destination image 68 is formed having an upper layer 120 and a lower layer 122. As can be seen in FIG. 3b, upper layer 120 is a one-dimensional representation of the outer circle of polar representation 67, while lower layer 122 is a one-dimensional representation of the inner circle of polar representation 67. The present invention sums along the axis of one of the two "unwrapped" layers to create a one-dimensional circumferential projection. Returning now to FIG. 1b, the one-dimensional circumferential projection 120 thus created at step 86, becomes the subject of the pattern match step 88. Once edges have been detected and matched to a pattern, this embodiment also proceeds to select a next candidate center at step 84, until all candidates have been evaluated. As with the first preferred embodiment, once a best fit for a center has been found, its location and dimensions are passed to the host controller 8 for further inspection processing.

Figure 1C:
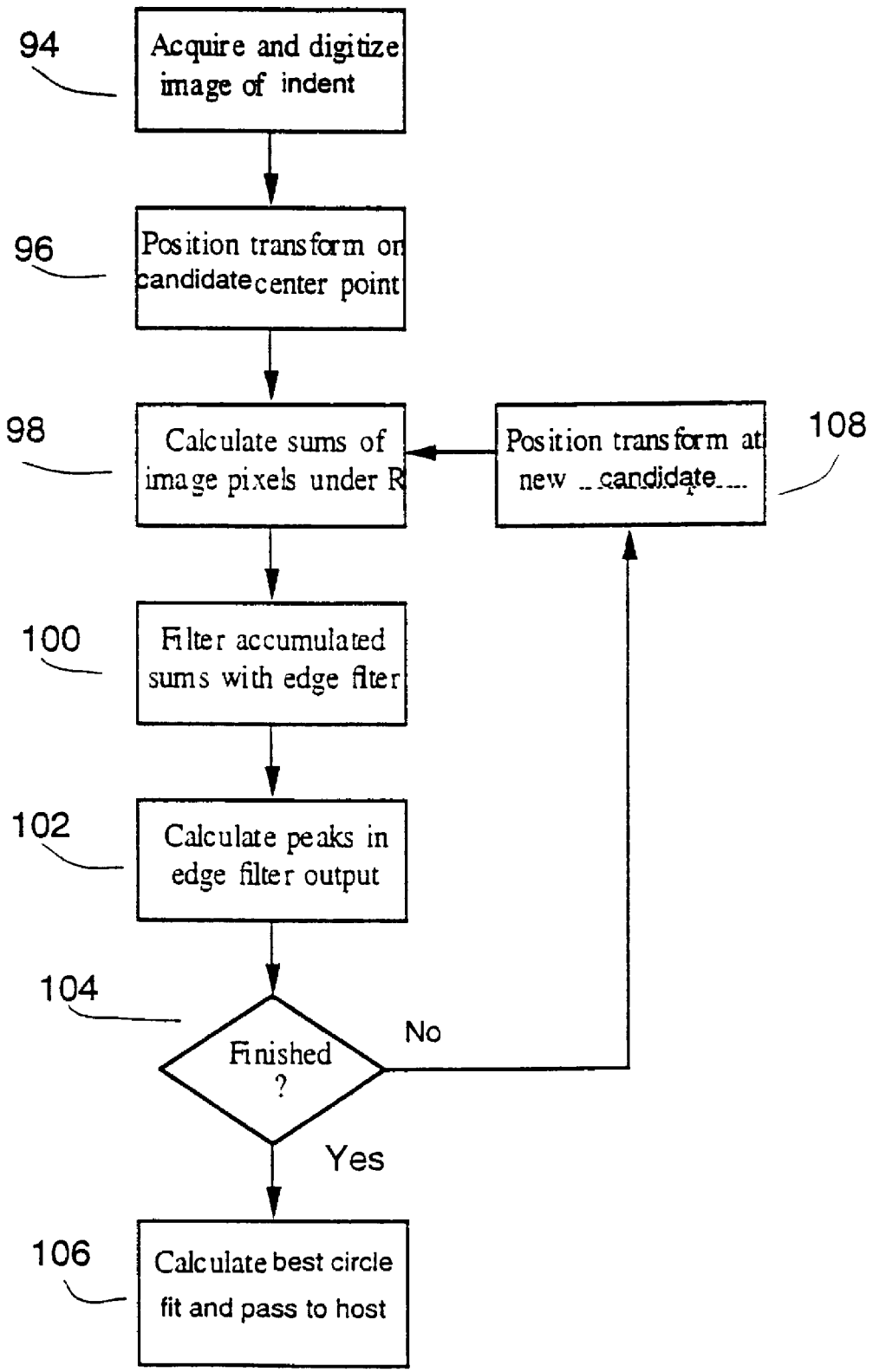
FIG. 1c is a flow diagram of still another preferred embodiment of the present invention using a polar coordinate transform image to create a one-dimensional circumferential projection.
Figure 2:
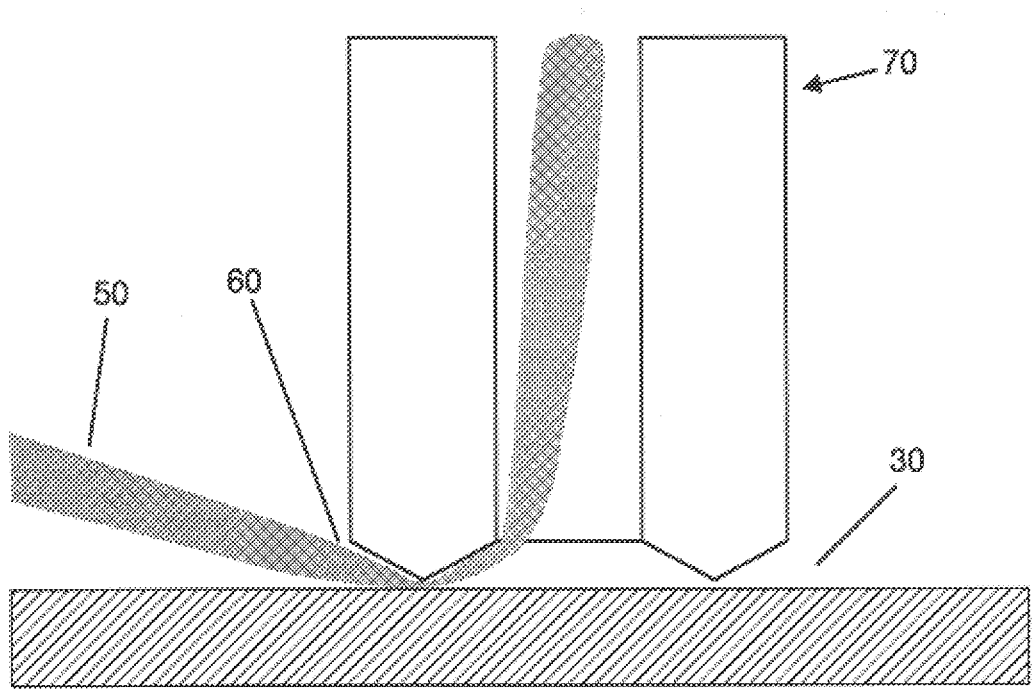
FIG. 2 is a schematic cutaway side view of a bond head capillary.

Now with reference to FIG. 1c, still another preferred embodiment is shown in flow diagram form. In this embodiment, a circular or polar transform image 110 is created and positioned on the candidate center of a candidate subset 65 of acquired image 66 as shown at step 96 in FIG. 1c.

Figure 3C:
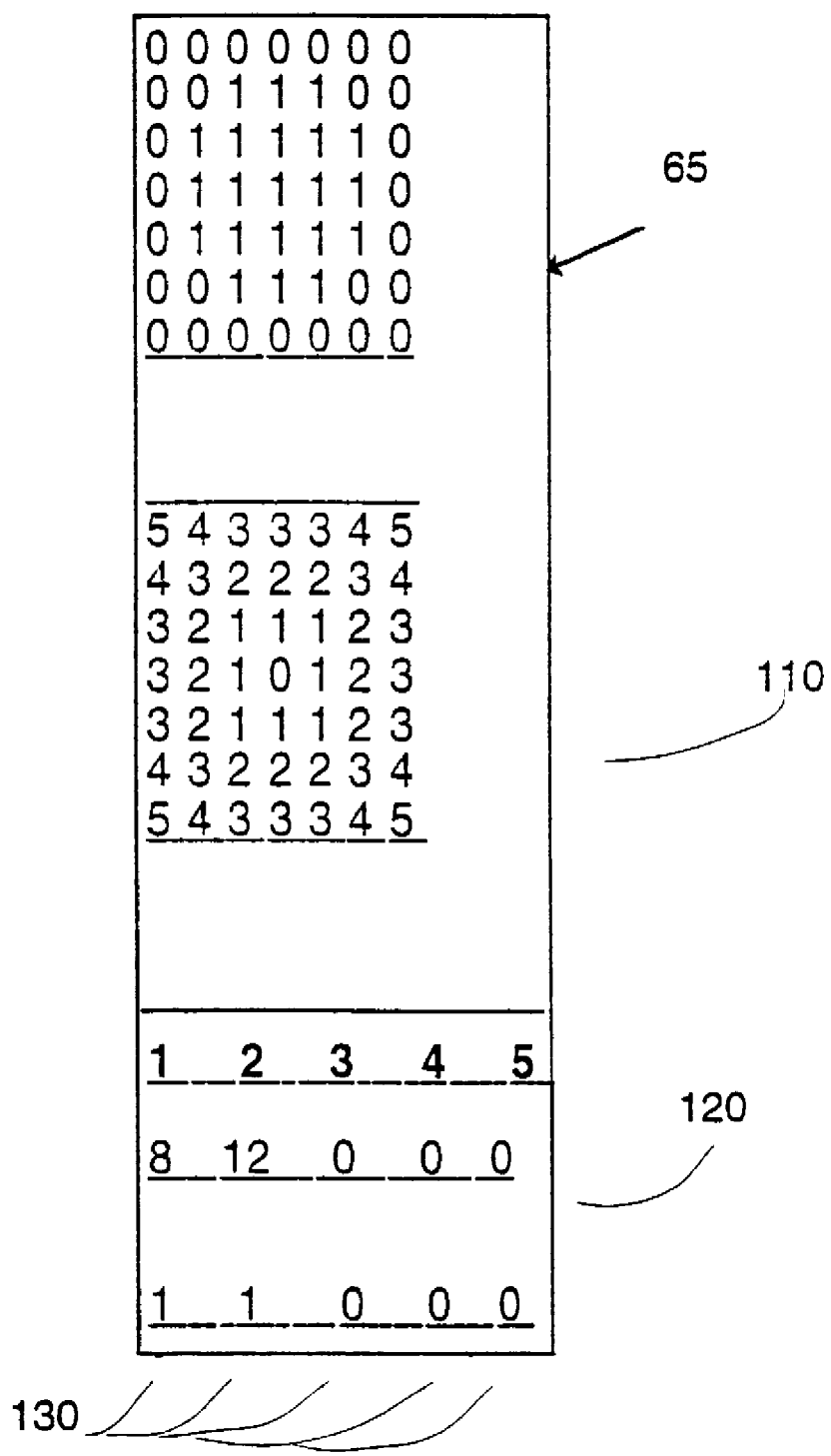
FIG. 3c is a schematic drawing of a one dimensional projection created by using a polar coordinate transform image according to the method and apparatus of the present invention.

An illustrative transform image 110 is shown in FIG. 3c. In FIG. 3c, it is assumed for purposes of illustration, that this candidate subset is 7 pixels wide and 7 pixels high and each pixel contains an intensity value (here shown only as 0 or 1). As also shown in FIG. 3c, a synthetically created transform image 110 has the same dimensions as candidate subset 65, but each pixel value in transform image 110 is an address into a histogram array or one-dimensional circumferential projection 120. In FIG. 3c this is shown as a one dimensional histogram array one-dimensional circumferential projection 120 that can store the sums of the intensity values of candidate subset 65. In this preferred embodiment, each intensity value for location x,y in candidate subset 65 is summed into the histogram bin 130 as selected by the transform image 110 value at corresponding location x,y in transform image 110. For finding circles, an transform image where each x,y location contains the distance of that pixel location from the center of the image is used, such as transform image 110.

The value at each pixel location in transform image 110 is actually an approximation of the radius of a circle with its center at the center of the image. The actual construction of transform image 110 can be done in many ways. In a preferred embodiment the value at each location is the euclidean distance to the center rounded to the nearest integer. The integer values are necessary to allow for a finite and manageable number of histogram bins. The present invention constructs an transform image (It) having a center located at xc, yc and an image size and radius value larger than the maximum size and radius values of a selected ring of an expected capillary indentation mark to be measured, using the following formula:

$$It(x, y) = \sqrt{(x - xc)^2 + (y - yc)^2} \quad ;$$

The histogram or one-dimensional circumferential projection 120 that results is a histogram where each bin 130 contains the sum of all of the pixels under a narrow ring-like region in the candidate subset 65 that correspond to the rings in transform image 110.

Figure 9:
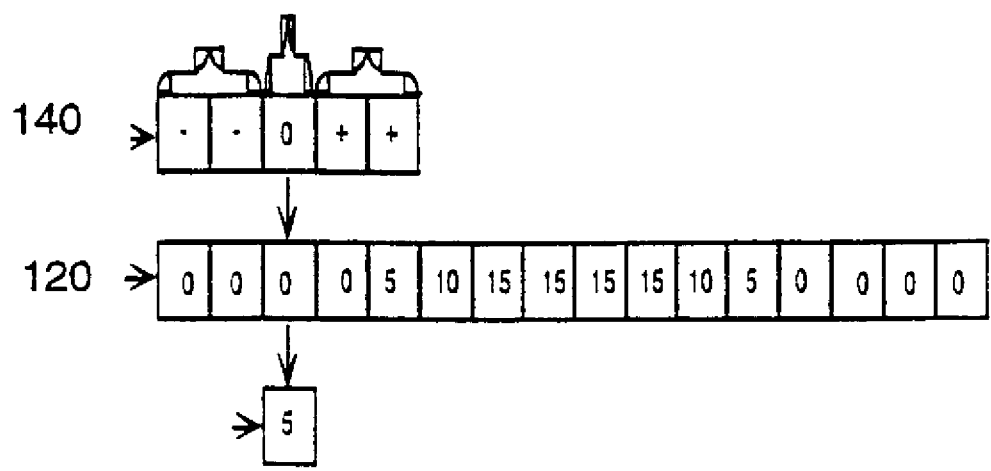
FIG. 9 is a schematic drawing of an edge filter according to the method and apparatus of the present invention.

This one dimensional histogram array or one-dimensional circumferential projection 120 contains the sum of the intensity values at various radiuses from the center of a candidate subset 65. If a black circle of radius R is centered in the image, the sums from radius 0 up to radius R will be the sums of the black values in the circle. For radiuses larger than R, the values will be the sums of the background values. If there is sufficient contrast between the circle values and the background values, there will be a large change in the sums at radius R in the histogram. Therefore the histogram values can be used to determine the radius of the circle. To do this, the first derivative of the one-dimensional circumferential projection 120 is calculated with a filtering operation as indicated at step 100 in FIG. 1c. An edge filter 140, as shown in FIG. 9 is used, although a number of edge filtering or detection techniques known in the art can be used.

Returning to FIG. 1c, the present invention calculates the peaks in the output of edge filter 140 at step 102. Once all of these have been calculated, as shown at step 104, the maximum of these peaks is calculated at step 106 The point at which the derivative is maximum is at the radius R.

If the circle is not at the center of this candidate subset 65, the peak value of the derivative of the histogram will be lower than if it is centered perfectly. This can be used to find the center of a circle by applying the transform image at a number of candidate center location points on the image that contains the circle. The point at which the peak value is maximum gives the best fit to a circle and is the center of the circle.

Figure 8A:
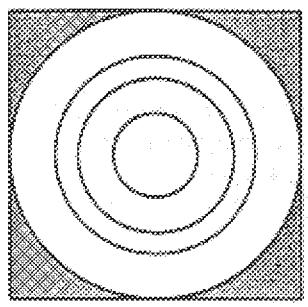
FIG. 8a is a schematic drawing of a full circle transform image created according to the method and apparatus of the present invention.
Figure 8B:
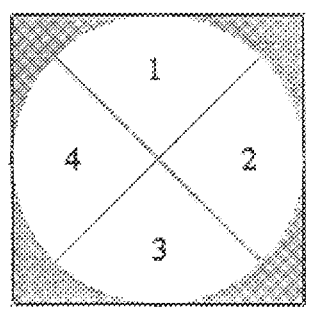
FIG. 8b is a schematic drawing of a transform image with multiple segments according to the method and apparatus of the present invention.

Turning now to FIGS. 8a and 8b, one can also use this technique to fit arcs to edges of a circle. Instead of using an transform image 110 that is a full circle as indicated in FIG. 8a, an transform image of a partial circle or pie slice 1, 2, 3, or 4 shown in FIG. 8b is used. If the object to be inspected is not perfectly circular, one can measure the object in a number of pie slice transform images. For example, if four pie slices are used, as shown in FIG. 8b, one can fit an arc as above with four separate projection histograms.

Returning again to FIG. 1c, in a preferred embodiment at step 94 a window of application points or candidate center location points is created around the expected center of the acquired indentation image 66. Then projection using an transform image 110 is run at each pixel within a window. Each pixel thus represents the center of a candidate subset 65. The radiuses that are evaluated are within a certain radius tolerance range. Either the inner or outer edge of capillary indentation mark 60 can be used as a feature to locate.

On bright rings, the inner edge would have a positive slope (dark to light) and the outer edge would have a negative slope. In a preferred embodiment, at each application point or candidate center location, the radius and the edge strength are found as described above. The point that has the highest contrast edge is the best circle fit and will be deemed to be the center of the indentation mark.

In still another preferred embodiment the invention runs on a sub-sampled candidate subset 65. That is, instead of evaluating each of the candidate center locations in image 66 this preferred embodiment samples some smaller number of candidate center locations, such as every other candidate center or every third or fourth candidate center. This is primarily to facilitate faster processing. Once a center is found, an interpolation technique can be used to find the center position more accurately. The sub-sampling numbers can be derived empirically or specified arbitrarily. Sub-sampling, pyramidal decomposition, and hill climbing, as well as other interpolation methods such as subpixel interpolation, linear interpolation, quadratic fit interpolation and so on can also be combined with each of the other preferred embodiments of the present invention, to get the best size and the best position.

In a preferred embodiment, Cognex Corporatio's VC-1 image processing chip, described in U.S. Pat. No. 4,972,359, assigned to the same Assignee as the Assignee of this invention, and hereby incorporated by reference, is used to maximize the speed of the creation and evaluation of the projections using transform images 110. Using this image processing chip, an entire projection can be done in the time that it takes to access the candidate center location image and polar coordinate transform model pixels from memory—as each pixel in a column in the image 66 is accessed, it is automatically summed into a polar projection by the VC-1 image processing system.

When the center of capillary indentation mark 60 has been located according to the method and apparatus of the present invention, and its size is known, this information is passed, together with any information about x and y dimensions requested, to a host controller 8 for appropriate action. Depending on the results, chips may be rejected for defects or marked for further work or encapsulated or sent to the next step of assembly. Attorney Docket Number C95-017 PATENT Those skilled in the art will appreciate that the embodiments described above are illustrative only, and that other systems in the spirit of the teachings herein fall within the scope of the invention.

A preferred embodiment of the present invention also includes a camera or other device for generating a video or image signal. The video signal generated by the camera is typically converted from analog to digital by techniques well known in the art and sent to an image memory, such as a frame grabber, or similar device for storing images. A vision processor system, which includes a computer central processing chip, and input/output capabilities, is coupled to the image memory and is used to perform image processing and analysis according to the present invention. Portions of image processing and analysis are accomplished by software programs controlling the vision processor system, or, as will be evident to one skilled in the art, can be controlled by equivalent circuits created in special integrated circuit chips. The results of image processing and analysis are transmitted electronically to the apparatus or system requiring the machine vision results. Alternatively, the machine vision function can be incorporated within and work as part of a larger system.

What is claimed is:

1. In a system capable of acquiring, digitizing and analyzing an image a method for locating and measuring a capillary indentation mark on a wire bonded lead, comprising the steps of:

selecting a candidate center location in said image;

creating a one-dimensional circumferential projection for said candidate center location such that a bin of said one-dimensional circumferential projection contains a normalized pixel intensity value for the circumference of an expected shape at said candidate center location;

detecting signals in said one-dimensional circumferential projection that correspond to a predefined pattern for a capillary indentation mark; and storing the results of said detecting step, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

2. The method of claim 1, wherein said detecting step further comprises the step of using an edge filter to locate high contrast edges in said one-dimensional circumferential projection.

3. The method of claim 1, wherein said selecting step further comprises selecting every n candidate center location in said image to evaluate, where n is a sub-sampling rate supplied by the user of said system.

4. In a system capable of acquiring, digitizing and analyzing an image, a method for locating and measuring a capillary indentation mark on a wire bonded lead, comprising the steps of:

selecting a candidate center location in said image;

creating a one-dimensional circumferential projection for said candidate center location such that each bin (BIN) of said one-dimensional circumferential projection contains a normalized pixel intensity value(I) for each circle at a selected radius(R) in said candidate center location calculated as follows:

$$BIN(R) = \sum_{\phi=0}^{\phi=360} I(R, \phi)$$

where $I(R, \phi)$ is the pixel intensity value at location $R,\phi$ in polar coordinates;

detecting edges in said one-dimensional circumferential projection that correspond to a predefined pattern for a capillary indentation mark; and storing the results of said detecting step, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

5. The method of claim 4 wherein said detecting step further comprises the step of using an edge filter to locate high contrast edges in said one-dimensional circumferential projection.

6. The method of claim 4, wherein said selecting step further comprises selecting every n candidate center location in said image to evaluate, where n is a sub-sampling rate supplied by the user of said system.

7. In a system capable of acquiring, digitizing and analyzing an image, a method for locating and measuring a capillary indentation mark on a wire bonded lead, comprising the steps of:

selecting a candidate center location in said image;

generating a two-dimensional polar destination image using a polar unwrap;

creating a one-dimensional circumferential projection by summing along an axis of said two-dimensional polar destination image of said candidate center location such that each bin of said one-dimensional circumferential projection contains a normalized pixel intensity value for each circle at a selected radius in said candidate center location;

detecting edges in said one-dimensional circumferential projection that correspond to a predefined pattern for a capillary indentation mark; and storing the results of said detecting step, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

8. The method of claim 7 wherein said detecting step further comprises the step of using an edge filter to locate high contrast edges in said one-dimensional circumferential projection.

9. The method of claim 7 wherein said selecting step further comprises selecting every n candidate center location in said image to evaluate, where n is a sub-sampling rate supplied by the user of said system.

10. In a system capable of acquiring, digitizing andanalyzing an image, a method for locating and measuring a capillary indentation mark on a wire bonded lead, comprising the steps of:

constructing an transform image (It) having a center located at xc, yc and a size and radius value larger than the maximum size and radius values of a selected ring of an expected capillary indentation mark to be measured, using the following formula:

$$It(x, y) = \sqrt{(x - xc)^2 + (y - yc)^2} \quad ;$$

selecting a candidate center location in said image;

aligning the center of said transform image with said candidate center location so that each x, y coordinate of said candidate center location corresponds to an x, y location in said transform image; and evaluating said candidate center location and said transform image simultaneously, whereby each pixel value in said candidate center location is summed into a one-dimensional circumferential projection indexed by the pixel value at the corresponding x,y coordinate in said transform image, such that a one-dimensional histogram is created and stored in said one-dimensional circumferential projection, said one-dimensional circumferential projection having a number of bins equal to the maximum radius size of said selected ring of said expected capillary indentation mark wherein each bin has indexes ranging from zero to said maximum radius size of said transform image; and detecting edges in said one-dimensional circumferential projection that correspond to a predefined pattern for a capillary indentation mark; and storing the results of said detecting step, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

11. The method of claim 10 wherein said detecting step further comprises the step of using an edge filter to locate high contrast edges in said one-dimensional circumferential projection.

12. The method of claim 10 wherein said selecting step further comprises selecting every n candidate center location in said image to evaluate, where n is a sub-sampling rate supplied by the user of said system.

13. The method of claim 10, wherein the step of constructing an transform image further comprises dividing said transform image into quadrants by adding a first constant pixel value to pixels in a first quadrant, a second constant pixel value to pixels in a second quadrant, a third constant pixel value to pixels in a third quadrant and a fourth constant pixel value to pixels in a fourth quadrant.

14. The method of claim 10, wherein said step of evaluating said candidate center location and said transform image simultaneously further comprises:

generating four one-dimensional circumferential projections, each representing one of said quadrants, such that four radiuses are located and their respective differences from an expected capillary indentation mark center location can be reported in the x and y directions.

15. In a system capable of acquiring, digitizing and analyzing an image, an apparatus for locating and measuring a capillary indentation mark on a wire bonded lead, comprising:

means for selecting a candidate center location in said image,;

means for creating a one-dimensional circumferential projection for said candidate center location such that each bin of said one-dimensional circumferential projection contains a normalized pixel intensity value for each circle at a selected radius in said candidate center location;

means for detecting edges in said one-dimensional circumferential projection that correspond to a predefined pattern for a capillary indentation mark; and means for storing the results found by said means for detecting edges, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

16. The apparatus of claim 15, wherein said means for detecting edges further comprises an edge filter means used to locate high contrast edges in said one-dimensional circumferential projection.

17. The apparatus of claim 15, wherein said means for selecting a candidate center location further comprises a means for selecting every n candidate center location in said image to evaluate, where n is a sub-sampling rate supplied by the user of said system.

18. In a system capable of acquiring, digitizing and analyzing an image, an apparatus for locating and measuring a capillary indentation mark on a wire bonded lead, comprising:

means for selecting a candidate center location in said image;

means for creating a one-dimensional circumferential projection for said candidate center location such that each bin (BIN) of said one-dimensional circumferential projection contains a normalized pixel intensity value (I) for each circle at a selected radius(R) in said candidate center location calculated as follows:

$$BIN(R) = \sum_{\phi=0}^{\phi=360} I(R, \phi)$$

where $I(R, \phi)$ is the pixel intensity value at location $R,\phi$ in polar coordinates;

means for detecting edges in said one-dimensional circumferential projection that correspond to a predefined pattern for a capillary indentation mark; and means for storing the results of said means for detecting edges, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

19. The apparatus of claim 18 wherein said means for detecting edges further comprises an edge filter means to locate high contrast edges in said one-dimensional circumferential projection.

20. The apparatus of claim 18, wherein said means for selecting a candidate center location further comprises means for selecting every n candidate center location in said image to evaluate, where n is a sub-sampling rate supplied by the user of said system.

21. In a system capable of acquiring, digitizing and analyzing an image, an apparatus for locating and measuring a capillary indentation mark on a wire bonded lead, comprising:

means for selecting a candidate center location in said image;

means for generating a two-dimensional polar destination image using polar unwrap to map pixel intensity values in said candidate center location into normalized pixel intensity values in a polar destination image;

means for creating a one-dimensional circumferential projection for said candidate center location by summing along an axis of said two-dimensional polar destination image such that each bin of said one-dimensional circumferential projection contains a normalized pixel intensity value for each circle at a selected radius in said candidate center location;

means for detecting edges in said one-dimensional circumferential projection that correspond to a predefined pattern for a capillary indentation mark; and means for storing the results of said means for detecting edges, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

22. The apparatus of claim 21 wherein said means for detecting edges further comprises an edge filter means to locate high contrast edges in said one-dimensional circumferential projection.

23. The apparatus of claim 21 wherein said means for selecting a candidate center location further comprises means for selecting every n candidate center location in said image to evaluate, where n is a sub-sampling rate supplied by the user of said system.

24. In a system capable of acquiring, digitizing and analyzing an image, an apparatus for locating and measuring a capillary indentation mark on a wire bonded lead, comprising:

means for constructing an transform image (It) having a center located at xc, yc and a size and radius value larger than the maximum size and radius values of a selected ring of an expected capillary indentation mark to be measured, using the following formula:

$$It(x, y) = \sqrt{(x - xc)^2 + (y - yc)^2} \;\; ;$$

means for selecting a candidate center location in said image,;

means for aligning the center of said transform image with said candidate center location so that each x, y coordinate of said candidate center location corresponds to an x, y location in said transform image; and means for evaluating said candidate center location and said transform image simultaneously, whereby each pixel value in said candidate center location is summed into a one-dimensional circumferential projection indexed by the pixel value at the corresponding x,y coordinate in said transform image, such that a one-dimensional histogram is created and stored in said one-dimensional circumferential projection, said one-dimensional circumferential projection having a number of bins equal to the maximum radius size of said selected ring of said expected capillary indentation mark wherein each bin has indexes ranging from zero to said maximum radius size of said transform image; and means for detecting edges in said one-dimensional circumferential projection that correspond to a predefined pattern for a capillary indentation mark; and means for storing the results of said means for detecting edges, so that as each candidate center location is evaluated, the candidate center location with the one-dimensional circumferential projection having the best fit is deemed the center of said capillary indentation mark, and the distance from said candidate center location with the one-dimensional circumferential projection having the best fit to its edge is deemed to be the radius of said capillary indentation mark, thus locating and measuring said capillary indentation mark.

25. The apparatus of claim 24 wherein said means for detecting edges further comprises an edge filter means to locate high contrast edges in said one-dimensional circumferential projection.

26. The apparatus of claim 24 wherein said means for selecting a candidate center location further comprises means for selecting every n candidate center location in said image to evaluate, where n is a sub-sampling rate supplied by the user of said system.

27. the apparatus of claim 24, wherein said means for constructing an transform image further comprises dividing said transform image into quadrants by adding a first constant pixel value to pixels in a first quadrant, a second contrast pixel value to pixels in a second quadrant, a third constant pixel value to pixels in a third quadrant and a fourth constant pixel value to pixels in a fourth quadrant.

28. The apparatus of claim 24, wherein said means for evaluating said candidate center location and said transform image simultaneously further comprises means for generating four one-dimensional circumferential projection, each representing one of said quadrants, such that four radiuses are located and their respective differences from an expected capillary indentation mark center location can be reported in the x and y directions.

\* \* \* \* \*